US008803996B2

(12) United States Patent
Nobuoka et al.

(10) Patent No.: US 8,803,996 B2
(45) Date of Patent: Aug. 12, 2014

(54) IMAGE PICKUP APPARATUS FOR PREVENTING UNNATURAL MOTION OF A MOTION IMAGE

(75) Inventors: Kosuke Nobuoka, Yokohama (JP); Makoto Oota, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 308 days.

(21) Appl. No.: 12/995,654

(22) PCT Filed: Jun. 2, 2009

(86) PCT No.: PCT/JP2009/002449
§ 371 (c)(1),
(2), (4) Date: Dec. 1, 2010

(87) PCT Pub. No.: WO2009/147829
PCT Pub. Date: Dec. 10, 2009

(65) Prior Publication Data
US 2011/0122271 A1    May 26, 2011

(30) Foreign Application Priority Data

Jun. 3, 2008 (JP) ................................. 2008-145333
Jun. 27, 2008 (JP) ................................. 2008-168493

(51) Int. Cl.
*H04N 5/235* (2006.01)
*H04N 9/64* (2006.01)

(52) U.S. Cl.
USPC ....................................... 348/222.1; 348/305

(58) Field of Classification Search
None
See application file for complete search history.

(56) References Cited

U.S. PATENT DOCUMENTS

| 5,661,525 | A | * | 8/1997 | Kovacevic et al. | ............ 348/452 |
| 5,838,373 | A | * | 11/1998 | Hasegawa et al. | ............ 348/312 |
| 6,124,888 | A | * | 9/2000 | Terada et al. | ................. 348/302 |
| 6,798,448 | B1 | | 9/2004 | Motono et al. | |
| 6,850,282 | B1 | * | 2/2005 | Makino et al. | ................. 348/371 |
| 2003/0193573 | A1 | * | 10/2003 | Miyashita et al. | ....... 348/207.99 |
| 2005/0105836 | A1 | * | 5/2005 | Gomi et al. | ................... 384/302 |
| 2008/0100734 | A1 | | 5/2008 | Gomi et al. | |

FOREIGN PATENT DOCUMENTS

| EP | 1168833 A2 | 1/2002 |
| GB | 2249898 A | 5/1992 |
| JP | 63-185291 A | 7/1988 |
| JP | 2001-352483 A | 12/2001 |
| JP | 2002-209838 A | 7/2002 |
| JP | 2003-032549 A | 1/2003 |
| JP | 2006-121761 A | 5/2006 |

OTHER PUBLICATIONS

Extended European Search Report dated Apr. 24, 2012 for European Application No. 09758096.3.
Japanese Office Action issued in corresponding application No. 2008-168493 dated Feb. 19, 2013.

* cited by examiner

*Primary Examiner* — Twyler Haskins
*Assistant Examiner* — Dwight C Tejano
(74) *Attorney, Agent, or Firm* — Carter, DeLuca, Farrell & Schmidt, LLP

(57) ABSTRACT

Whether a user of a video camera can discern an unnatural motion or the discernable unnatural motion is permissible is evaluated based on an taken image so as to make a change between mixing of still image shooting driving and maintaining of motion image shooting driving.

12 Claims, 11 Drawing Sheets

Fig. 8
|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  |   |   |   |   |   |   |   |   |   |    |    |    |    |    |    |    |
| 2  |   |   |   |   |   |   |   |   |   |    |    |    |    |    |    |    |
| 3  |   |   |   |   |   |   |   |   |   |    |    |    |    |    |    |    |
| 4  |   |   |   |   |   |   |   |   |   |    |    |    |    |    |    |    |
| 5  |   |   |   |   |   |   |   |   |   |    |    |    |    |    |    |    |
| 6  |   |   |   |   |   |   |   |   |   |    |    |    |    |    |    |    |
| 7  |   |   |   |   |   |   |   |   |   |    |    |    |    |    |    |    |
| 8  |   |   |   |   |   |   |   |   |   |    |    |    |    |    |    |    |
| 9  |   |   |   |   |   |   |   |   |   |    |    |    |    |    |    |    |
| 10 |   |   |   |   |   |   |   |   |   |    |    |    |    |    |    |    |
| 11 |   |   |   |   |   |   |   |   |   |    |    |    |    |    |    |    |
| 12 |   |   |   |   |   |   |   |   |   |    |    |    |    |    |    |    |
| 13 |   |   |   |   |   |   |   |   |   |    |    |    |    |    |    |    |
| 14 |   |   |   |   |   |   |   |   |   |    |    |    |    |    |    |    |
| 15 |   |   |   |   |   |   |   |   |   |    |    |    |    |    |    |    |
| 16 |   |   |   |   |   |   |   |   |   |    |    |    |    |    |    |    |
Fig. 9
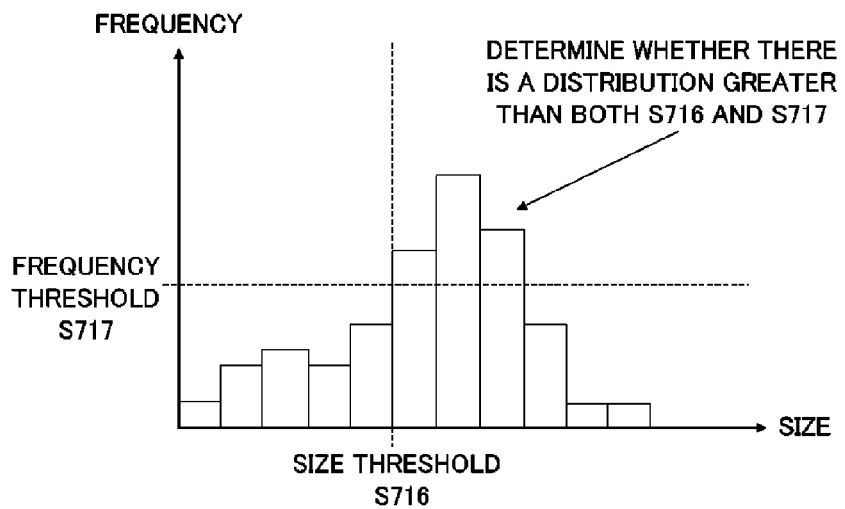
Fig. 10
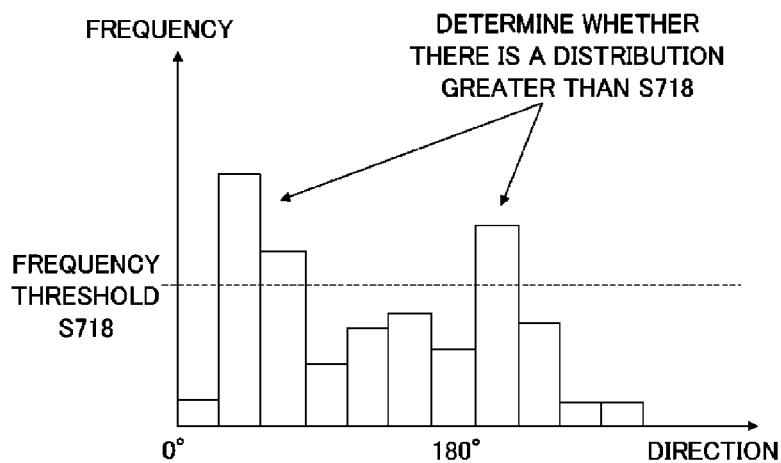

PERIPHERAL AREA HISTOGRAM

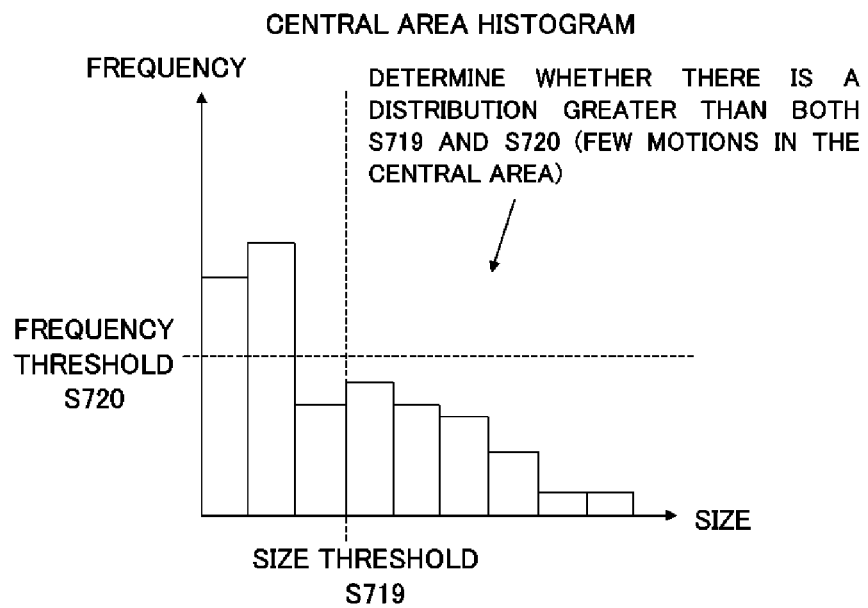

IMAGE PICKUP APPARATUS FOR PREVENTING UNNATURAL MOTION OF A MOTION IMAGE

TECHNICAL FIELD

The present invention relates to an image pickup apparatus.

BACKGROUND ART

Recent image pickup apparatuses, such as a video camera, not only take and record motion images pursuant to the television standard but also take and record still images using pixels more than those for the television standard. In addition, as the number of pixels in the image sensor increases, it is necessary in the motion image shooting and recording to read out a two-dimensional image from the image sensor at least at a field period in accordance with the television standard. Therefore, in the motion image shooting and recording of the motion images, the number of readout pixels from the image sensor is reduced by cutting reading, thinning reading, and pixel adding reading, and the number of reading channels or the reading velocity is increased. However, the increased number of reading channels or a higher reading velocity will increase the cost and the consumption power, and thus a proposal to reduce the number of pixels to be read out of the image sensor is effective in the motion image shooting. Some video camera bodies may have a switch that switches between a motion image shooting mode and a still image shooting mode, a motion image shooting trigger, and a still image shooting trigger.

On the other hand, in order to keep the right timing to take a good image through simplified operations, it is proposed to eliminate switching between the motion image shooting mode and the still image shooting mode and to provide the still image shooting during the motion image shooting. See, for example, PLT1. PLT1 takes and records still images at a field timing that continues to a field timing used to generate a motion image, and supplements the field period in which the motion image is absent, by converting the still image into the motion image.

However, PLT1 poses a problem of an unnatural motion of a motion image when an absent motion image is format-converted from a still image during the still image shooting while the object is moving.

CITATION LIST

Patent Literature

[PTL 1]
Patent No. 2001-352483

SUMMARY OF INVENTION

Technical Problem

The present invention provides an image pickup apparatus configured to prevent an unnatural output image as a result of a mixture of a still image into a motion image.

Solution to Problem

An image pickup apparatus according to one aspect of the present invention includes an image sensor configured to output an image signal by taking an object, a driver configured to drive the image sensor so as to take the object through interlace scanning or progressive scanning, a detector configured to detect a state of the object based on the image signal output from the image sensor, and a controller configured to control the driver to select one of interlace shooting used to take the object through the interlace scanning of the image sensor, and progressive shooting used to take the object through the progressive scanning of the image sensor, in accordance with the state of the object detected by the detector.

An image pickup apparatus according to another aspect of the present invention includes an image sensor configured to output an image signal by taking an object, a driver configured to drive the image sensor so as to take the object through interlace scanning or progressive scanning, and a controller configured to control the driver to drive the image sensor by the interlace scanning in taking and recording a still image during waiting to take and record a motion image or during taking and recording of the motion image, and to drive the image sensor by the progressive scanning in taking and recording the still image without taking or recording the motion image.

Further features of the present invention will become apparent from the following description of exemplary embodiments (with reference to the attached drawings).

Advantageous Effects of Invention

The present invention can provide an image pickup apparatus configured to prevent an unnatural output image as a result of a mixture of a still image into a motion image.

BRIEF DESCRIPTION OF DRAWINGS

FIG. 8 is an illustrative image division of a motion vector detection (first embodiment).

FIG. 9 is an illustrative motion vector size histogram (first embodiment).

FIG. 10 is an illustrative motion vector direction histogram (first embodiment).

FIG. 12A is an example of a peripheral area histogram and FIG. 12B is an example of a central area histogram.

DESCRIPTION OF EMBODIMENTS

Referring now to the accompanying drawings, a description will be given of embodiments according to the present invention.

Embodiment 1

Figure 1:
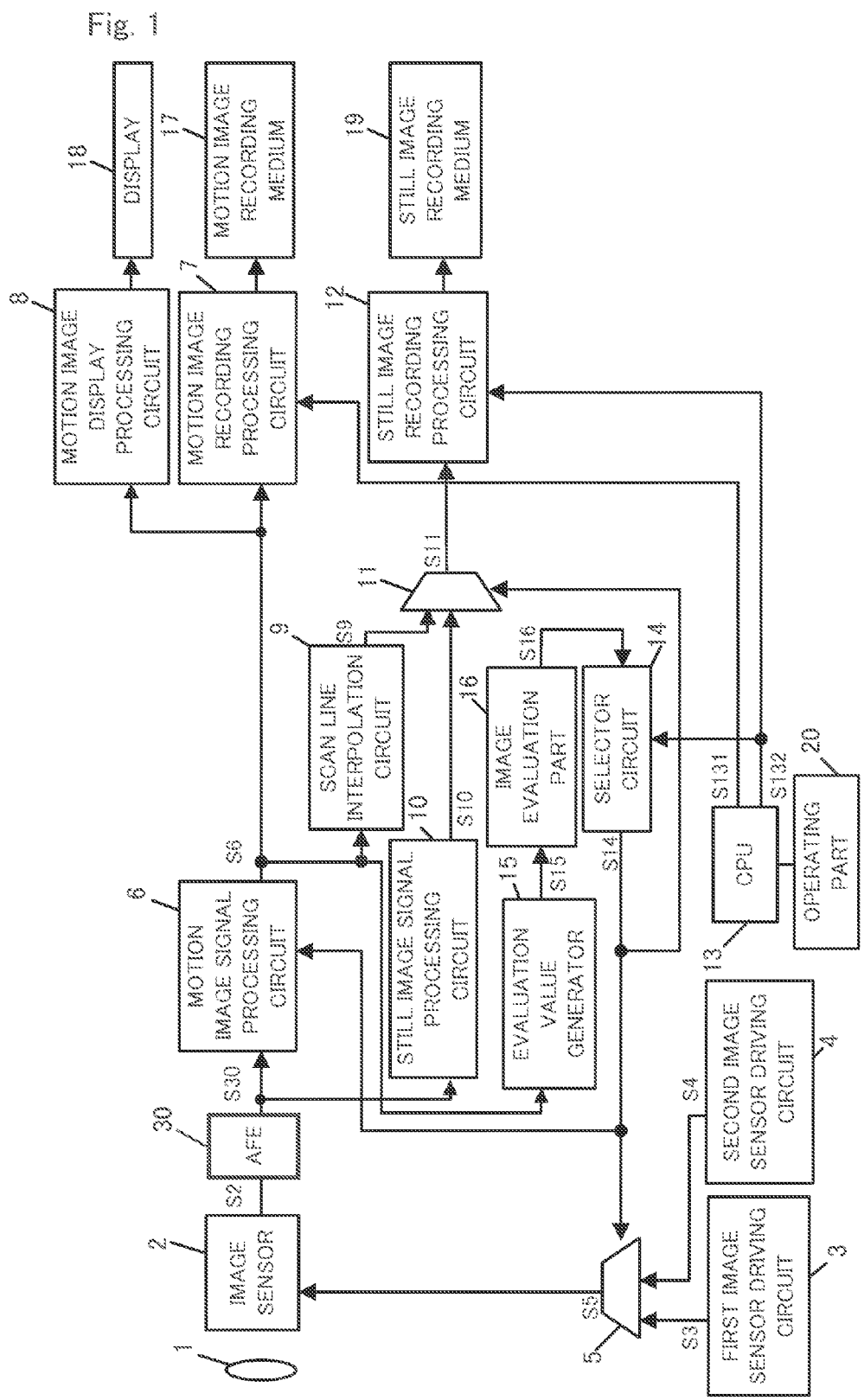
FIG. 1 is a block diagram of a video camera (first embodiment).

FIG. 1 is a block diagram of a video camera (image pickup apparatus) according to this embodiment.

An image of an object is formed on an image sensor 2 through a lens 1, and the image sensor 2 photographs the object and outputs a video output signal S2. A (first) selector 5 selects one of a vertical/horizontal ("V/H") synchronization signal S3 output from a first image sensor driving circuit 3 and a V/H synchronization signal S4 output from a second image sensor driving circuit 4. The selector 5 supplies, as its output signal S5, the V/H synchronization signal S3 or S4 to the image sensor 2.

The first image sensor driving circuit 3 generates the V/H synchronization signal S3 used to drive the image sensor 2 so as to convert an object image taken through interlace scanning of the image sensor 2 into an electric signal. The second image sensor driving circuit 4 generates the V/H synchronization signal S4 used to drive the image sensor 2 so as to convert an object image taken through progressive scanning of the image sensor 2 into an electric signal. The video output signal S2 corresponds to the interlace scanning when the V/H synchronization signal S3 is supplied to the image sensor 2, and to the progressive scanning when the V/H synchronization signal S4 is supplied to the image sensor 2.

The motion image signal processing circuit 6 receives, as input signals, the video output signal S2 of the image sensor 2 and an output signal S1 of the selector circuit 14, performs motion-image signal processing for the video output signal S2 of the image sensor 2, and outputs, as an output signal S6, a motion image signal based on the interlace scanning.

The motion image recording processing circuit 7 receives, as input signals, the output signal S6 of the motion image signal processing circuit 6 and an output signal S131 of the CPU 13, records the output signal S6 of the motion image signal processing circuit 6 in a motion image recording medium 17 when the motion image is being recorded, and performs no process when the motion image is not being recorded.

The motion image display processing circuit 8 receives, as an input signal, the output signal S6 of the motion image signal processing circuit 6, and provides a process to display the output signal S6 of the motion image signal processing circuit 6 in a display 18 attached to the image pickup apparatus. The motion image display processing circuit 8 performs the process to display the output signal S6 of the motion image signal processing circuit 6 whether the selector 5 selects the first image sensor driving circuit 3 or the second image sensor driving circuit 4.

The scan line interpolation circuit 9 receives, as an input signal, the output signal S6 of the motion image signal processing circuit 6. The scan line interpolation circuit 9 interpolates a scan line in the output signal S6 of the motion image signal processing circuit 6 as a video signal of the interlace scanning, converts it into a video signal of the progressive scanning, and outputs the output signal S9.

The evaluation value generator 15 receives an input signal, the output signal S6 of the motion image signal processing circuit 6, and generates an evaluation value S15 indicative of a state of a photographed motion image based on it.

The image evaluation part 16 receives, as an input signal, the evaluation value S15 of the evaluation value generator 15, and generates an image-sensor-driving determination signal S16 indicative to the motion image driving determination and the still image driving determination based on it. The "motion image driving determination" is a determination that the image sensor 2 is to be driven for a motion image, and the "still image driving determination" is a determination that the image sensor 2 is to be driven for a still image. More specifically, the image evaluation part 16 determines (or evaluates) that the image sensor 2 is to be driven for a motion image, when a large motion of an object in a motion image is detected in a certain direction. In addition, the image evaluation part 16 determines that the image sensor 2 is to be driven for a still image, when no motion of an object is detected in a motion image.

The still image signal processing circuit 10 receives as an input signal the output signal S2 of the image sensor 2, performs still-image signal processing for this signal, and outputs as an output signal S10 a video signal of the progressive scanning.

The selector 11 receives as input signals the output signal S9 of the scan line interpolation circuit 9, the output signal S10 of the still image signal processing circuit 10, and the output signal S14 of the selector circuit 14. The selector 11 selects one of the output signal S9 of the scan line interpolation circuit 9 and the output signal S10 of the still image signal processing circuit 10 based on the output signal S14 of the selector circuit 14, and outputs the selected signal as the output signal S11. More specifically, the selector 11 selects a third video signal of the scan line interpolation circuit 9 when the output signal S14 of the selector circuit 14 is 0, and a second video signal of the still image signal processing circuit 10 when the output signal S14 of the selector circuit 14 is 1.

The still image recording processing circuit 12 receives as input signals the output signal S11 of the selector 11 and the output signal S132 of the CPU 13. The still image recording processing circuit 12 records the output signal S11 of the selector 11 in a still image recording media 19 when a command to record a still image is issued, and performs no process when no command to record a still image is issued.

The CPU (controller) 13 outputs a signal S131 indicating that a motion image is being recorded or that recording of a motion image recording is being waited, and a signal S132 indicating that a command to record a still image is issued. More specifically, the CPU 13 outputs the output signal S131 of 0 when no motion image is being recorded or that no recording of a motion image is being waited, and the output signal S131 of 1 when a motion image is being recorded or that recording of a motion image is being waited. The CPU 13 outputs the output signal S132 of 0 when no command to record a still image is issued, and the output signal S131 of 1 when a command to record a still image is issued.

The operating part 20 includes a release button, an operation dial, a variety of buttons, a switch, and a lever, and informs the CPU 13 that a photographer has issued a command to take and record a motion or still image. The CPU 13 determines whether the command to take or record a motion or still image is issued, based on a notice from the operating part 20.

The selector circuit 14 receives as input signals the output signal S132 of the CPU 13 and the image-sensor-driving determination signal S16, and outputs as an output signal S14 a synchronization signal provided to the image sensor 2 and an output signal that determines an operation of the motion image signal processing circuit 6. The selector circuit 14 outputs an output signal S14 of 0 (first state signal) when receiving the output signal S16 form the image evaluation part 16 which indicates a determination signal that the image sensor 2 is to be driven for a motion image or when receiving the output signal S132 from the CPU 13 which indicates that a command to take and record a motion image from a standby state or a command to take and record a still image is issued during the motion image shooting. The selector circuit 14 outputs an output signal S14 of 1 (second state signal) when receiving the output signal S16 form the image evaluation part 16 which indicates a determination that the image sensor 2 is to be driven for a still image or when receiving the output signal S132 from the CPU 13 which indicates that a command to take and record a still image is issued from the standby state.

The selector 5 selects the first image sensor driving circuit 3 when the selector circuit 14 outputs the output signal S14 of 0 (first stage signal). The selector 5 selects the second image sensor driving circuit 3 when the selector circuit 14 outputs the output signal S14 of 1 (second stage signal). This configuration can prevent an unnatural output motion image as a result of a mixture of a still image into a motion image.

Figure 2:
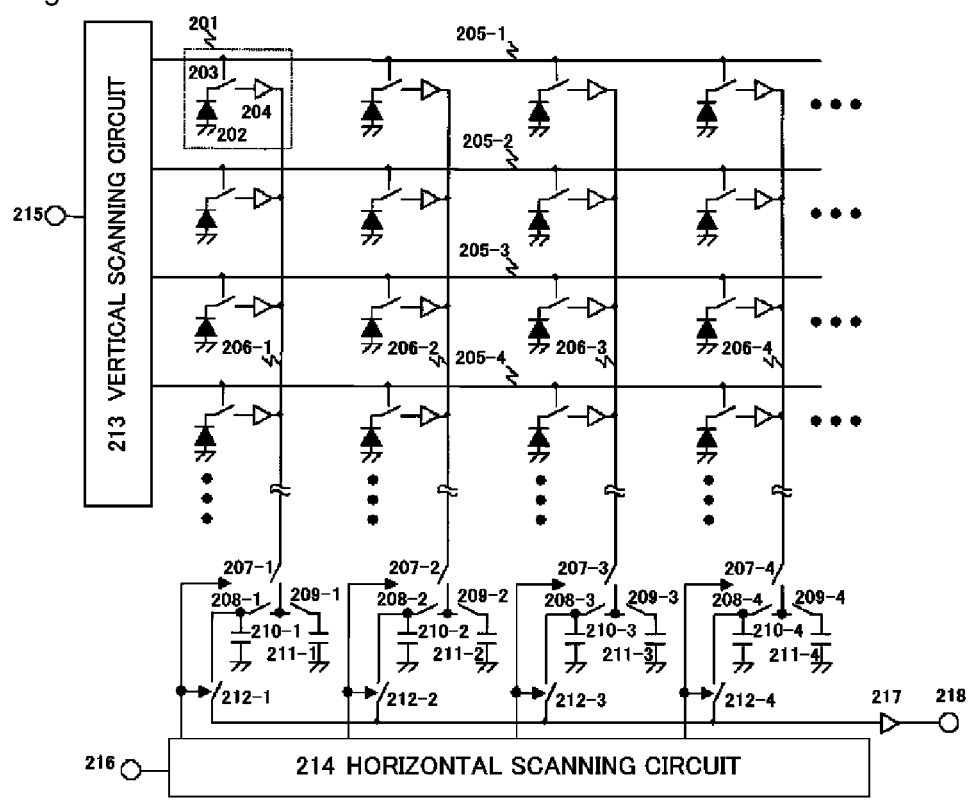
FIG. 2 is a circuit diagram showing details of a structure of an image sensor shown in FIG. 1.

FIG. 2 is a circuit diagram showing a structure of the image sensor 2, and shows only sixteen pixels of four vertical columns and four horizontal rows for description purposes, but actually there are more pixels of 1,080 vertical columns and horizontal 1,920 rows.

In FIG. 2, reference numeral 201 denotes a photoelectric conversion pixel part, including a photodiode 202, a pixel readout switch 203, and a charge voltage conversion buffer 204. The image sensor 2 has a plurality of photoelectric conversion elements. Reference numerals 205-1 to 205-4 are column selection lines for the first to fourth columns, and column selection lines for the fifth to $1,080^{th}$ are omitted. Reference numerals 206-1 to 206-4 are row selection lines for the first to fourth rows, and row selection lines for the fifth to $1,920^{th}$ rows are omitted. Reference numerals 207-1 to 207-4 are row selection switches for first to fourth rows, and row selection switches for the fifth to $1,920^{th}$ rows are omitted.

Reference numerals 208-1 to 208-4 are selection switches for first horizontal capacitors for the first to fourth rows, and selection switches for the fifth to $1,920^{th}$ rows are omitted. Reference numerals 209-1 to 209-4 are selection switches for second horizontal capacitors for the first to fourth rows, and selection switches for the fifth to $1,920^{th}$ rows are omitted. Reference numerals 210-1 to 210-4 are first horizontal capacitors for the first to fourth rows, and the first horizontal capacitors for the fifth to $1,920^{th}$ rows are omitted. Reference numerals 211-1 to 211-4 are second horizontal capacitors for the first to fourth rows, and the second horizontal capacitors for the fifth to $1,920^{th}$ rows are omitted.

Reference numerals 212-1 to 212-4 are horizontal driving switches for the first to fourth rows, and horizontal driving switches for the fifth to $1,920^{th}$ rows are omitted. Reference numeral 213 denotes a vertical scanning circuit, and reference numeral 214 denotes a horizontal scanning circuit. Reference numeral 215 denotes a vertical synchronization signal input which is input from the first image sensor driving circuit 3 or the second image sensor driving circuit 4 via the selector 5. Reference numeral 216 denotes a horizontal synchronization signal input which is input from the first image sensor driving circuit 3 or the second image sensor driving circuit 4 via the selector 5. Reference numeral 217 denotes an output signal buffer, and reference numeral 218 denotes a video signal output.

The image sensor 2 operates as follows based on a synchronization signal provided by the first image sensor driving circuit 3 or the second image sensor driving circuit 4 via the selector 5. FIGS. 3 to 6 are timing charts of the image sensor 2.

Figure 3:
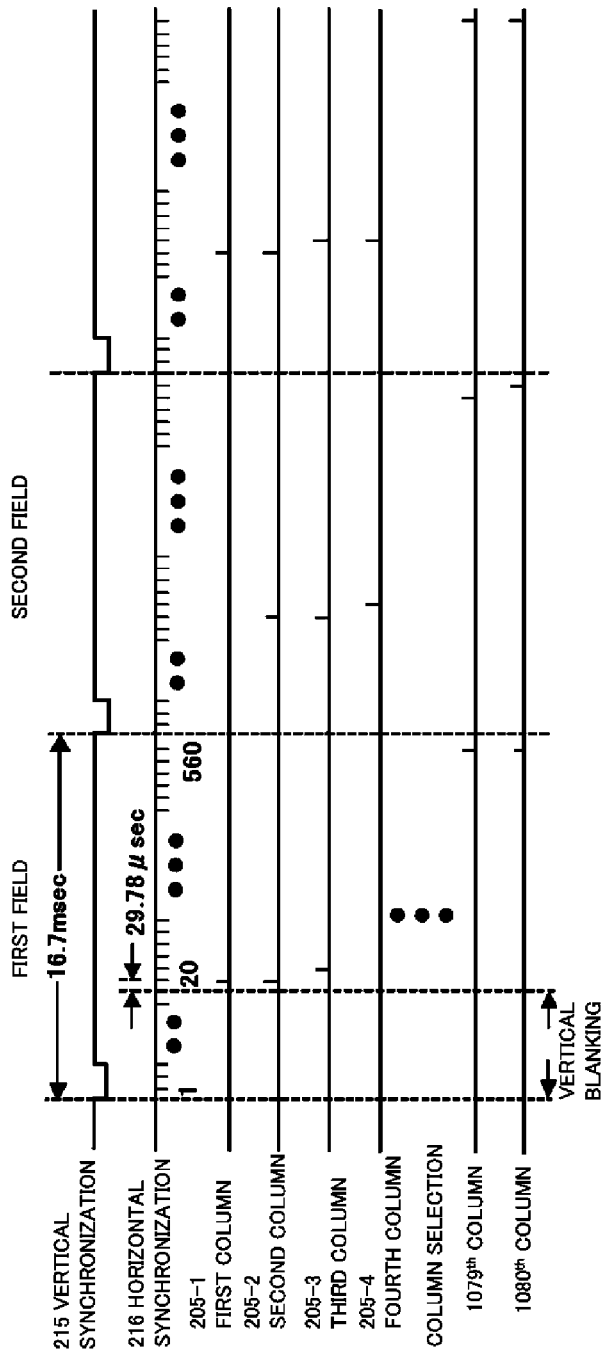
FIG. 3 is a timing chart of the image sensor shown in FIG. 2.

When the selector 5 selects the first image sensor driving circuit 3, as shown in FIG. 3, the vertical synchronization signal is provided at a field driving period of 16.7 msec=1/59.96 sec from the vertical synchronization signal input 215, and a horizontal synchronization signal is provided at a field driving period of 29.78 microseconds=16.7 msec/560 H from the horizontal synchronization signal input 216. Thereby, vertical driving for a vertical blanking period of 20H and a vertical effective period of 540H is provided.

In the first field shown in FIG. 3, the vertical scanning circuit 213 scans the column selection lines every two columns per one horizontal synchronization period after the vertical blanking period. In other words, the column selection lines 205-1 and 205-2 for the first and second columns, and the column selection lines 205-3 and 205-4 for the third and fourth columns, . . . the column selection lines for the $1079^{th}$ and $1080^{th}$ columns are scanned in these combinations.

Figure 4:
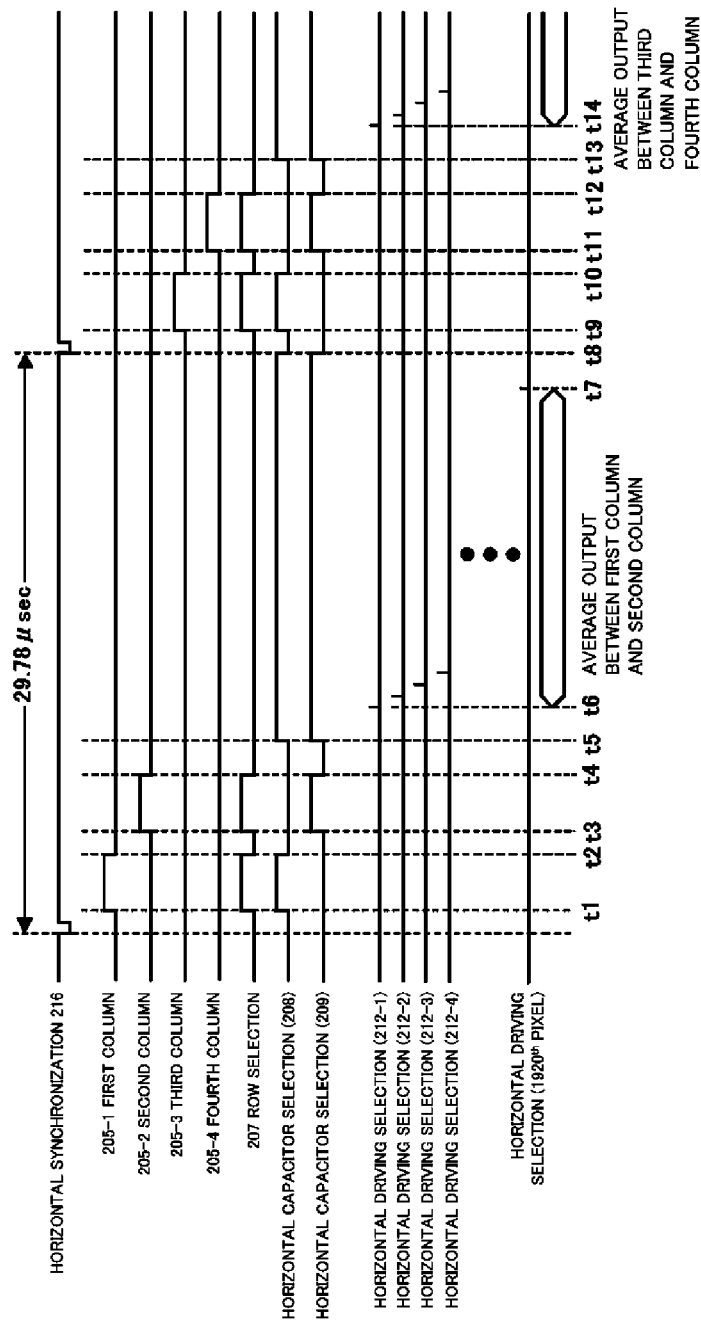
FIG. 4 is a timing chart of the image sensor shown in FIG. 2.

FIG. 4 shows detailed operations of the column selection lines and the horizontal scanning circuit 214. When the horizontal synchronization signal is asserted, in the subsequent time period t1-t2, the column selection line 205-1 for the first column is asserted, and the photoelectric conversion signals from 1920 photoelectric conversion elements connected to the column selection line 205-1 for the first column are simultaneously read out to the 1920 row signal lines.

As shown in FIG. 4, in the time period t1-t2, the row selection switch 207 and the selection switch 208 for the first horizontal capacitor are also simultaneously asserted. Assume that in FIG. 4, reference numeral 207 represents "207-1," "207-2," . . . , reference numeral 208 represents "208-1," "208-2," . . . , and reference numeral 209 represents "209-1," "209-2," . . . . The photoelectric conversion signals from the 1920 photoelectric conversion elements connected to the column selection line 205-1 for the first column are accumulated in the first horizontal capacitor (such as 210-1).

Next, in a time period t3-t4, the column selection line 205-2 for the second column is asserted, and the photoelectric conversion signal from the 1,920 photoelectric conversion elements connected to the column selection line 205-2 for the second column are read out. In the time period t3-t4, the row selection switches 207 and the selection switches 209 for the second horizontal capacitors are also simultaneously asserted. Therefore, the photoelectric conversion signals from the 1,920 photoelectric conversion elements connected to the column selection line 205-2 for the second column are accumulated in the second horizontal capacitor (such as 211-1).

Next, at the time t5, both the selection switches 208 for the first horizontal capacitors and the selection switches 209 for the second horizontal capacitors are asserted. As a result, the photoelectric conversion signals for the first column and the photoelectric conversion signals for the second column held by the first capacitors (such as 210-1) and the second horizontal capacitors (such as 211-1) are averaged.

Next, in a time period t6-t7, the horizontal driving switches (such as 212-1) for the 1,920 rows are sequentially asserted. Thus, the video signal made by vertically averaging the 1,920 photoelectric conversion element outputs for the first and second columns passes the output signal buffer 217, and is output from the video signal 218. At the time t8 or later, an operation of the next horizontal synchronization period is performed (average reading of the photoelectric conversion signals for the third and fourth columns).

In the second field shown in FIG. 3, the vertical scanning circuit 213 scans the column selection lines every two columns per one horizontal synchronization period after the vertical blanking period. In other words, the column selection lines 205-2 and 205-3 for the second and third columns, and the column selection lines 205-4 for the fourth and fifth columns, . . . the column selection lines for the $1,080^{th}$ and $1,081^{th}$ columns are scanned (although the column selection line for the $1,081^{th}$ column is a dummy). This configuration can change a combination of the averaging for two adjacent vertical lines. Thereby, the second field has an interlace-scanning relationship with the first field.

Figure 5:
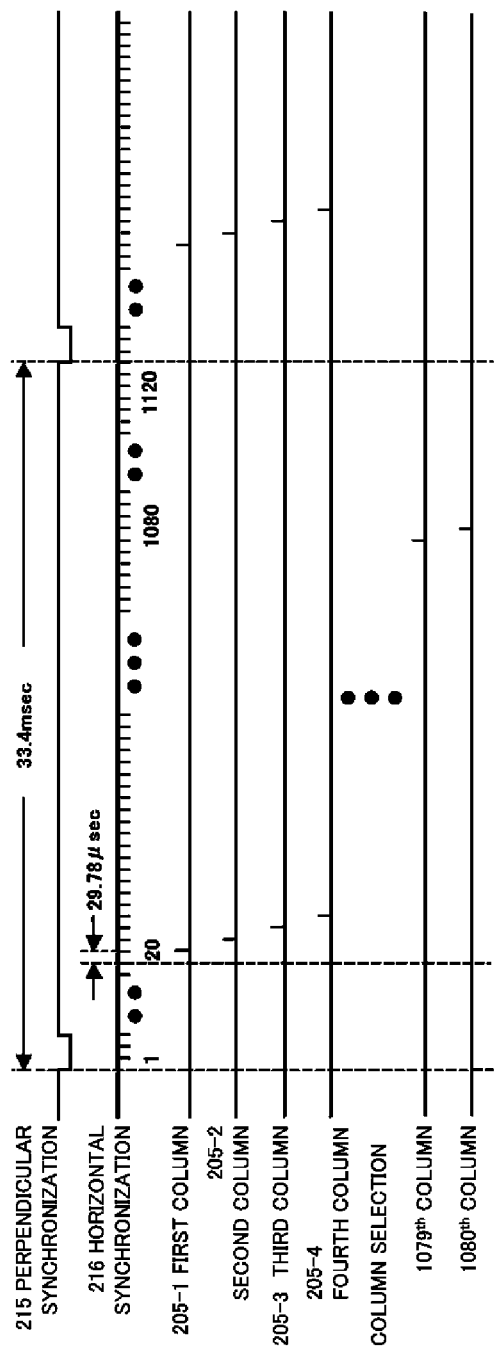
FIG. 5 is a timing chart of the image sensor shown in FIG. 2.

When the selector 5 selects the second image sensor driving circuit 4, as shown in FIG. 5, a vertical synchronization signal is provided at a period of 33.4 msec=1/29.97 sec that is twice as long as the field driving period from the vertical synchronization signal input 215, and a horizontal synchronization signal is provided at a period of 29.78 microseconds=29.97 msec/1120 H from the horizontal synchronization signal input 216. Thereby, vertical driving for a vertical blanking period of 20H, a vertical effective period of 1,080H, and a dummy period of 20H is provided.

The vertical scanning circuit 213 asserts every one column of the column selection line per one horizontal synchronization period after the vertical blanking period, and sequentially scans the column selection lines up to the column selection line for the 1,080$^{th}$ column. All the pixels are driven in a period of the two fields.

Figure 6:
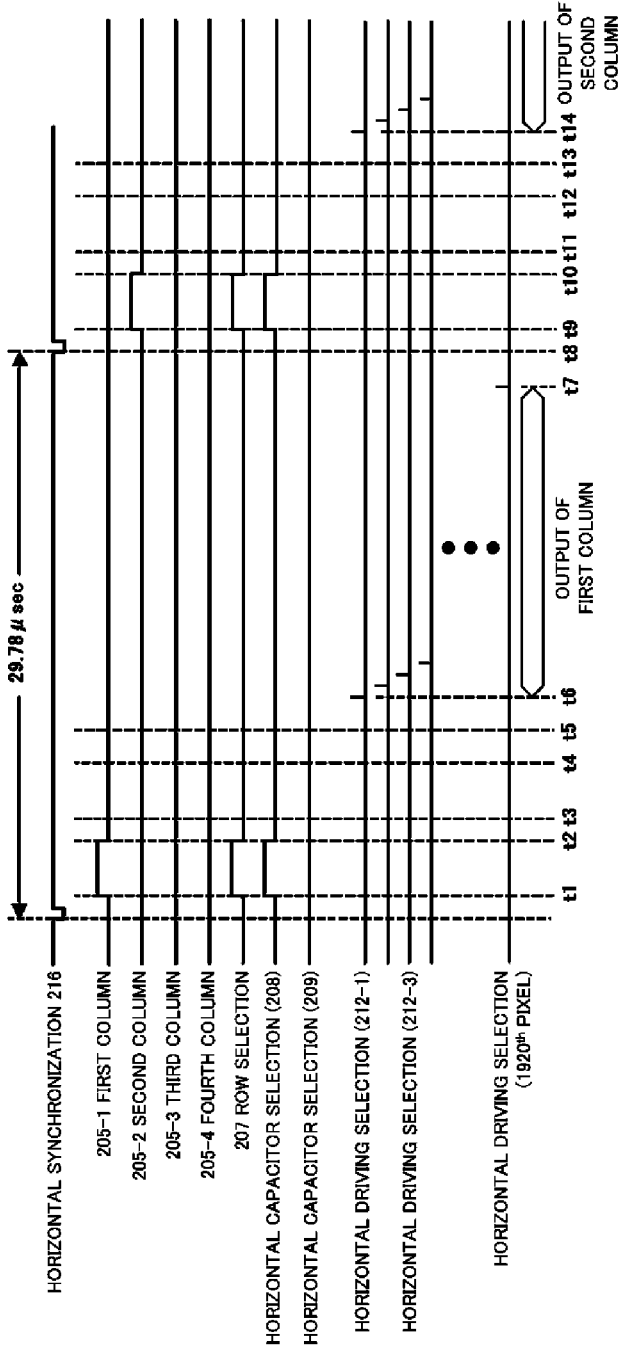
FIG. 6 is a timing chart of the image sensor shown in FIG. 2.

FIG. 6 shows detailed operations of the column selection lines and the horizontal scanning circuit 214. When the horizontal synchronization signal is asserted, in the subsequent time period t1-t2, the column selection line 205-1 for the first column is asserted, and the row selection switches 207 and the selection switches 208 for the first horizontal capacitors are simultaneously asserted. Thereby, the photoelectric conversion signals from the 1,920 photoelectric conversion elements connected to the column selection line 205-1 for the first column are accumulated in the first horizontal capacitors (such as 210-1).

In the subsequent time period t3-t5, no action is performed because nothing is asserted.

Next, in the time period t6-t7, the horizontal driving switches (such as 212-1) for the 1,920 rows are sequentially asserted. Thus, the 1,920 photoelectric conversion signals for the first column pass the output signal buffer 217, and are output from the video signal output 218. At the time t8 or later, the next horizontal synchronization period follows (reading of the photoelectric conversion signals for the second column). As a result, the video output as a result of progressive reading of all pixels is generated.

As described, when the selector 5 selects the V/H synchronization signal S3 output from the first image sensor driving circuit 3, the image sensor 2 outputs as the output signal S2 the video signal of the interlace scanning at the field period. On the other hand, when the output signal S5 from the selector 5 is the V/H synchronization signal S4 output from the image sensor driving circuit 4, the image sensor 2 outputs as the output signal S2 the video signal of the progressive scanning at the frame period.

When the output signal S14 from the selector circuit 14 is 0, the selector 5 outputs as the output signal S5 the V/H synchronization signal S3 output from the first image sensor driving circuit 3 so that the image sensor 2 can be driven by the interlace scanning at the field period. On the other hand, when the output signal S14 from the selector circuit 14 is 1, the selector 5 outputs as the output signal S5 the V/H synchronization signal S4 output from the second image sensor driving circuit 4 so that the image sensor 2 can be driven by the progressive scanning at the frame period.

The motion signal processing circuit 6 receives, as input signals, the video output signal S2 of the image sensor 2 and the output signal S14 of the selector circuit 14. When the output signal S14 of the selector circuit 14 is 0, the motion image signal processing circuit 6 performs a variety of motion-image processes, such as an aperture correction, a gamma correction, a brightness adjustment, and a white balance, and a resize process to an angle of view of a format for the motion image recording, and outputs the resultant signal as the output signal S6.

On the other hand, when the output signal S14 of the selector circuit 14 is 1, the output signal S6 of the motion image signal processing circuit 6 is valid only to the motion image display processing circuit 8. The motion image signal processing circuit 6 performs a resize process so that the output signal S2 of the image sensor 2 can have the same angle of view as that of the motion image processing time, and outputs the output signal S6 as the video signal of the interlace scanning. Alternatively, the motion image signal processing circuit 6 may output as the output signal S6 the image signal indicating that a still image is recorded.

When the output signal S131 of the CPU 13 is 1, the motion image recording processing circuit 7 records the output signal S6 of the motion image signal processing circuit 6 in the motion image recording medium, because a motion image is being recorded. On the other hand, when the output signal S131 of the CPU 13 is 0, the motion image recording processing circuit 7 does not perform any processes, because no motion image is being recorded.

The scan line interpolation circuit 9 performs a scan line interpolation process of the interlace scanning, and outputs as the output signal S9 the video signal of the progressive scanning. For example, the scan line interpolation process utilizes a field memory to delay an input signal by one field, performs a motion determination and a gradient determination based on the information of the current field and one previous field, and generates an interpolation line signal. The video signal of the progressive scanning is output by outputting the interpolated line signal and the input signal. This scan line interpolation process is one example, and an interpolation signal may be generated using a plurality of fields.

The still image signal processing circuit 10 performs a variety of still-image processes, such as an aperture correction, a gamma correction, a brightness adjustment, and a white balance, and outputs the resultant signal as the output signal S10.

The selector 11 selects one of the output signal S9 of the scan line interpolation circuit 9 and the output signal S10 of the still image signal processing circuit 10, and outputs the selected signal as the output signal S11. When the output signal S14 of the selector circuit 14 is 0, the selector 11 outputs as the output signal S11 the output signal S9 of the scan line interpolation circuit 9. On the other hand, when the output signal S14 of the selector circuit 14 is 1, the selector 11 outputs as the output signal S11 the output signal S10 of the still image signal processing circuit 10.

The still image recording processing circuit 12 receives, as input signals, the output signal S11 of the selector 11 and the output signal S132 of the CPU 13. The output signal S132 of the CPU 13 of 1 means that a command to record a still image is issued, and thus the still image recording processing circuit 12 records the output signal S11 of the selector 11 in the still image recording medium. The output signal S132 of the CPU 13 of 0 means that no command to record a still image is issued, and thus the still image recording processing circuit 12 performs no processes.

Figure 7:
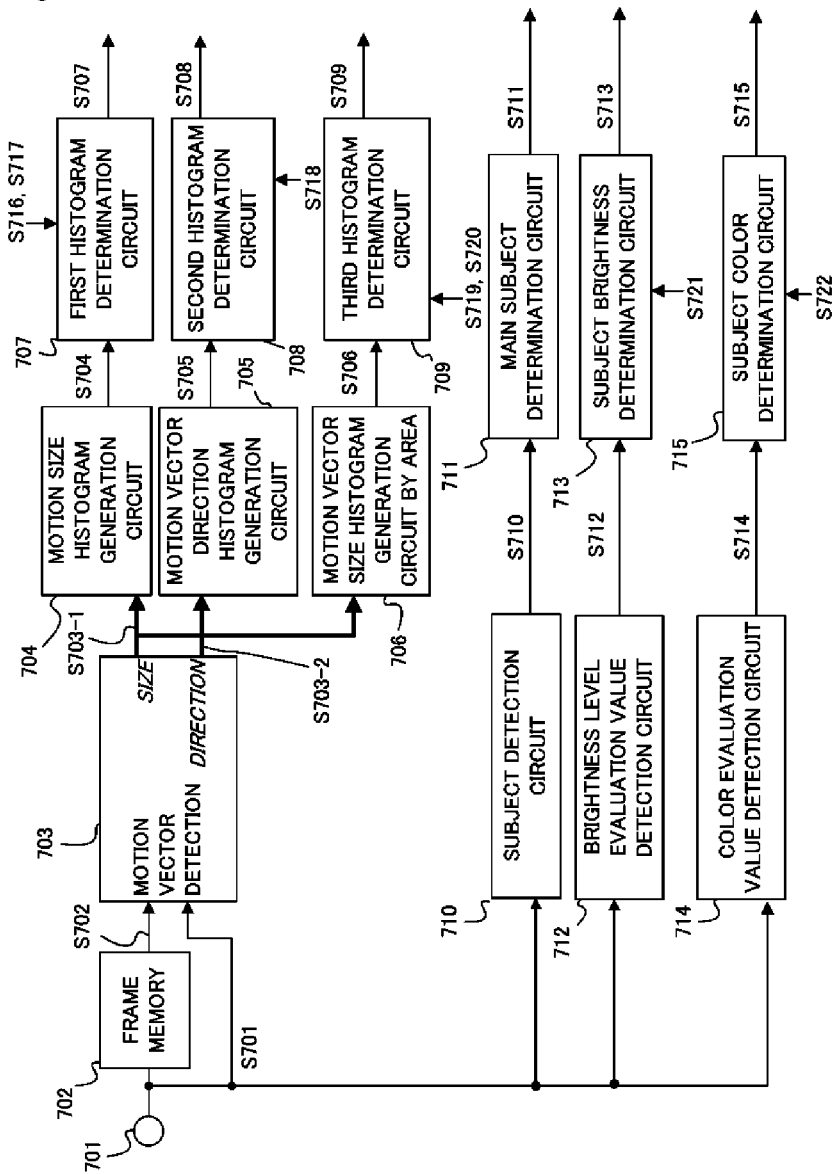
FIG. 7 is a block diagram showing details of a structure of an evaluation value generator shown in FIG. 1.

The evaluation value generator 15 generates an evaluation value S15 indicative of a state of a photographed motion image. FIG. 7 is a block diagram of a structure of the evaluation value generator 15. In FIG. 7, reference numeral 701 denotes an input terminal that receives the output signal S6 from the motion image signal processing circuit 6. Reference numeral 702 denotes a frame memory. Reference numeral 703 denotes a motion vector detection circuit. Reference numeral 704 is a motion vector size histogram generation circuit. Reference 705 denotes a motion vector direction histogram generation circuit.

Reference numeral 706 denotes a motion vector size histogram generation circuit by area. Reference numeral 707 denotes a first histogram determination circuit. Reference numeral 708 denotes a second histogram determination circuit. Reference numeral 709 denotes a third histogram determination circuit. Reference numeral 710 is a specific object detection circuit. Reference numeral 711 is a main object determination part. Reference numeral 712 denotes a brightness level evaluation value detection circuit. Reference numeral 713 denotes an object brightness determination part. Reference numeral 714 a color evaluation value detection circuit. Reference numeral 715 denotes an object color determination part.

A description will now be given of an operation of the evaluation value generator 15. The video signal S6 that has undergone motion-image signal processing and been input from the input terminal 701 is input each of the frame memory 702, the motion vector detection circuit 703, the specific object detection circuit 710, the brightness level evaluation value detection circuit 712, and the color evaluation value detection circuit 714.

The motion vector detection circuit 703 calculates a motion vector based on the video signal S701 and the video signal S702 that has been delayed by one frame by the frame memory 702. The motion vector is calculated for each of small 256 blocks made by dividing the shooting angle of view by sixteen in length and sixteen in width, as shown in FIG. 8, and is separated into a size and a direction. As a result, size data S703-1 and motion vector's direction data S703-2 are generated for each of the 256 motion vectors.

The size data S703-1 of the motion vector is input into the motion vector size histogram generation circuit 704 and the motion vector size histogram generation circuit by area 706. The direction data S703-2 of the motion vector is input into the motion vector direction histogram generation circuit 705.

The motion vector size histogram generation circuit 704 generates motion vector histogram data S704 based on size data S703-1 of the 256 motion vectors, as shown in FIG. 9, and inputs it in the first histogram determination circuit 707.

The first histogram determination circuit 707 also receives a first motion size detection threshold S716 and a first motion size frequency threshold S717. The first histogram determination circuit 707 determines, as shown in FIG. 9, whether there are a predetermined number of blocks or more in each of which a motion having a predetermined size is detected, and outputs a first motion determination output S707. In a situation where the first motion determination output S707 is asserted, it is determined that the object of the photographed motion image is moving with a predetermined size over a predetermined area.

The motion vector direction histogram generation circuit 705 generates motion vector direction histogram data S705 based on the direction data S703-2 of the 256 motion vectors, as shown in FIG. 10, and inputs it the second histogram determination circuit 708.

The second histogram determination circuit 708 also receives the motion direction frequency threshold S718. The second histogram determination circuit 708 determines, as shown in FIG. 10, whether there are a predetermined number of blocks or more in each of which a motion in a predetermined direction is detected, and outputs the second motion determination output S708. In a situation where the second motion determination output S708 is asserted, it is determined that the object of the photographed motion image is conspicuously moving in the specific direction.

Figure 11:
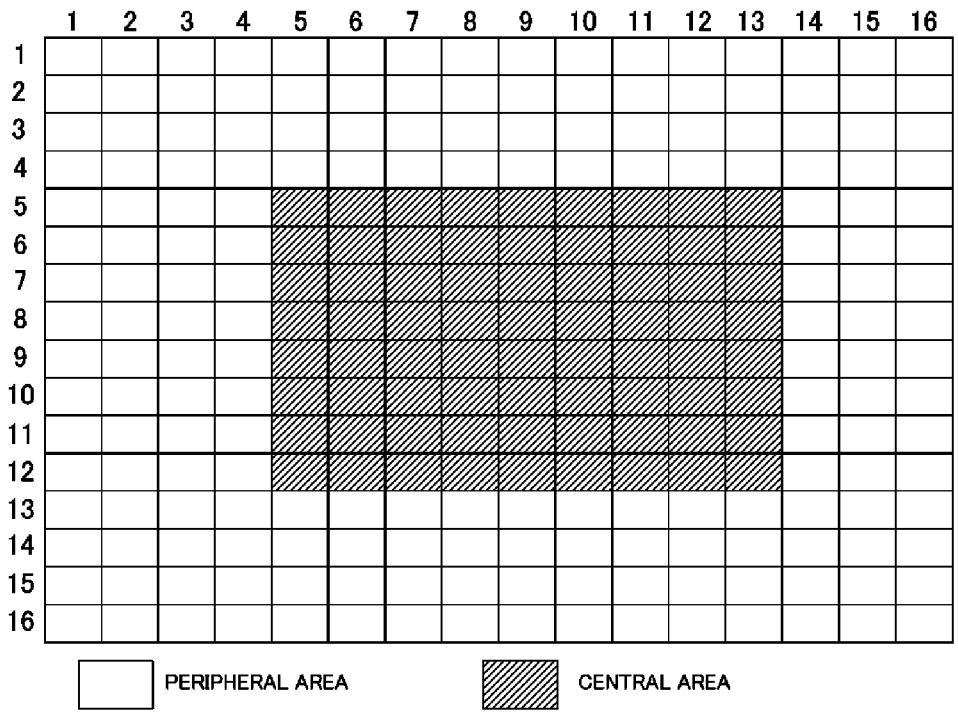
FIG. 11 is an illustrative motion vector size histogram by area (first embodiment).

The motion vector size histogram generation circuit by area 706 receives the size data S703-1 of the 256 motion vectors. As shown in FIG. 11, the motion vector size histogram generation circuit by area 706 divides the 256 motion vectors into a screen central part and a screen peripheral part, generates the motion vector size histogram data S706 for each area, and inputs it into the third histogram determination circuit 709.

The third histogram determination circuit 709 also receives the second motion size detection threshold S719 and the second motion size frequency threshold S720. The third histogram determination circuit 709 determines, as shown in FIG. 12, whether there are a predetermined number of blocks or more in each of which a motion having a predetermined size is detected for each of the screen central part and the screen periphery part, and outputs a third motion determination output S709 when it is determined that the motion exits only in the peripheral part.

Figure 12A:
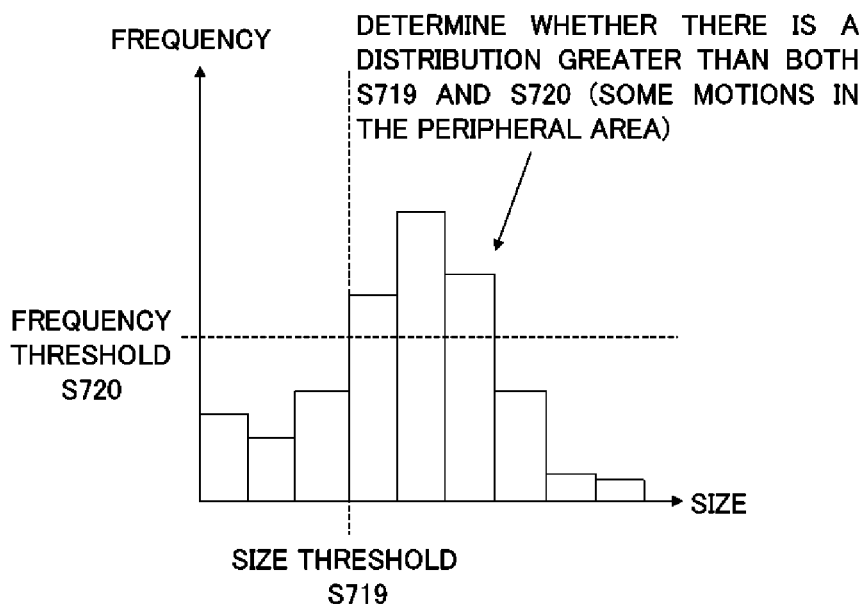

FIG. 12A shows a peripheral area histogram, and FIG. 12B shows a central area histogram. In the situation where the third motion determination output S709 is asserted, it is determined that the object of the photographed motion image is comparatively stationary, there is a motion in the background, and the object is panned.

The specific object detection circuit 710 detects, based on the input video signal S701, where an object having a specific feature, such as a human face, is located in the photographed motion image, and outputs a plurality of pieces of object position information S710. The main object determination part 711 determines one specific object based on the plurality of pieces of object position information S710, and outputs the main object position information S711. By referring to the main object position information S711, it can be determined whether a specific object exists in the photographed motion image.

The brightness level evaluation value detection circuit 712 generates a brightness level evaluation value S712 based on the video signal S701, for example, by extracting a brightness signal, by dividing a screen into a plurality of blocks for the brightness signal of the photographed motion image, and by generating an integral value of a brightness signal for each of a plurality blocks. The brightness level evaluation value S712 and the object brightness determination level S721 are input into the object brightness determination part 713.

The object brightness determination part 713, for example, compares a brightness evaluation value in the screen central part with the object brightness determination level S721, and outputs the object's brightness level determination result S713. By referring to the object's brightness level determination result S713, a value of the object's brightness relative to the object brightness determination level S721 can be determined.

The color evaluation value detection circuit 714, generates a specific color evaluation value S714 based on the video signal S701, for example, by extracting a color difference signal, by dividing a screen into a plurality of blocks for a color difference signal of the photographed motion image, and by integrating only color difference signals having specific values for each of a plurality blocks. The specific color evaluation value S714 and the object color determination level S722 are input into the object color determination part 715. The object color determination part 715 determines, for example, whether a specific color concentrates on the screen central part, and outputs an object's color level determination result S715. By referring to the object's color level determination result S715, it is determined whether the color of the object is contained in a specific color difference signal range.

As described above, the evaluation value S15 from the evaluation value generator 15 includes the first to third motion determination outputs S707, S708, and S709, the main object position information S711, the object's brightness level determination result S713, and the object's color level determination result S715. As a result, the evaluation value S15 indicates one of motion information of the object, information indicating whether a specific portion exists, information identifying a specific object among a plurality of objects, object's brightness information, and object's color information.

The image evaluation part 16 provides a motion image driving determination and a still image driving determination based on the evaluation value S15, as described later. Initially, the image evaluation part 16 generates a motion-image-driving determination signal S16 based on the first motion determination output S707 and the second motion determination output S708, when a large motion having a predetermined size or larger in a predetermined direction in the photographed motion image is detected. This configuration can prevent unnaturalness of a large movement of the object that is likely to be visually detected.

In addition, the image evaluation part 16 generates, based on the third motion determination output S709, a determination signal S16 that indicates that the image sensor 2 should be driven for a still image, when it is determined that a photographer is intentionally panning (when the peripheral part has a larger motion than the central part in the motion image). In addition, the image evaluation part 16 generates, based on the main object position information S711, a determination signal S16 that indicates that the image sensor 2 should be driven for a still image on the premise that a photographer is taking a desired object, when it is determined that a specific portion, such as a face of an object, exits in the photographed motion image. Thereby, even when there is a large and unnatural movement of an object which is likely to be visually detected, this is pursuant to the photographer's intension.

In addition, when the image evaluation part 16 determines, based on the object's brightness level determination result S713, that the object's brightness is lower than the threshold, the image evaluation part 16 generates a still-image-driving determination signal S16. In addition, when the image evaluation part 16 determines, based on the object's color level determination result S715, that the object's color is close to yellow (or within a specific color difference range that has yellow at the center), the image generation part 16 generates a motion-image-driving determination signal S16. Thereby, the image evaluation part 16 can change controls over unnaturalness depending upon a level at which the large movement of the object is visually detected.

In some cases, the image evaluation part 16 cannot uniquely determine whether the determination signal S16 determines motion image driving or still image driving based on S707, S708, S709, S711, S713, and S715 in the evaluation value S15. In these cases, the image evaluation part 16 may use a predetermined priority order, a majority rule, a known multivariate analysis result, a known neural network determination result, etc.

The selector circuit 14 receives, as input signals, the output signal S132 of the CPU 13 and the determination signal S16 used to drive the image sensor. When the output signal S132 of the CPU 13 is 1 and the determination signal S16 determines motion image driving, the output signal S14 of the selector circuit 14 becomes 0 and the image sensor 2 is controlled under field motion image driving of the interlace scanning. The motion image signal processing circuit 6 provides field motion image processing by the interlace scanning, and the field motion image is supplied to the motion image recording processing circuit 7 and the motion image display processing circuit 8. In addition, the selector 11 communicates the output signal S9 of the scan line interpolation circuit 9 to the still image recording processing circuit 12.

When the output signal S132 of the CPU 13 is 1 and the determination signal S16 used to drive the image sensor determines still image driving, the output signal S14 of the selector circuit 14 becomes 1 and the image sensor 2 is controlled under still image driving of the progressive scanning. The output signal S6 of the motion image signal processing circuit 6 is valid only relative to the motion image display processing circuit 8, the output signal S2 of the image sensor 2 is resized so that it has the same angle of view as that for the motion image processing time, and is output as a video signal of the interlace scanning. Alternatively, an image indicating that the still image is recorded may be output as an output signal S6. The still image signal processing circuit 10 provides still image processing by the progressive scanning, and the selector 11 communicates the output signal S10 of the still image signal processing circuit 10 to the still image recording processing circuit 12.

Embodiment 2

Figure 13:
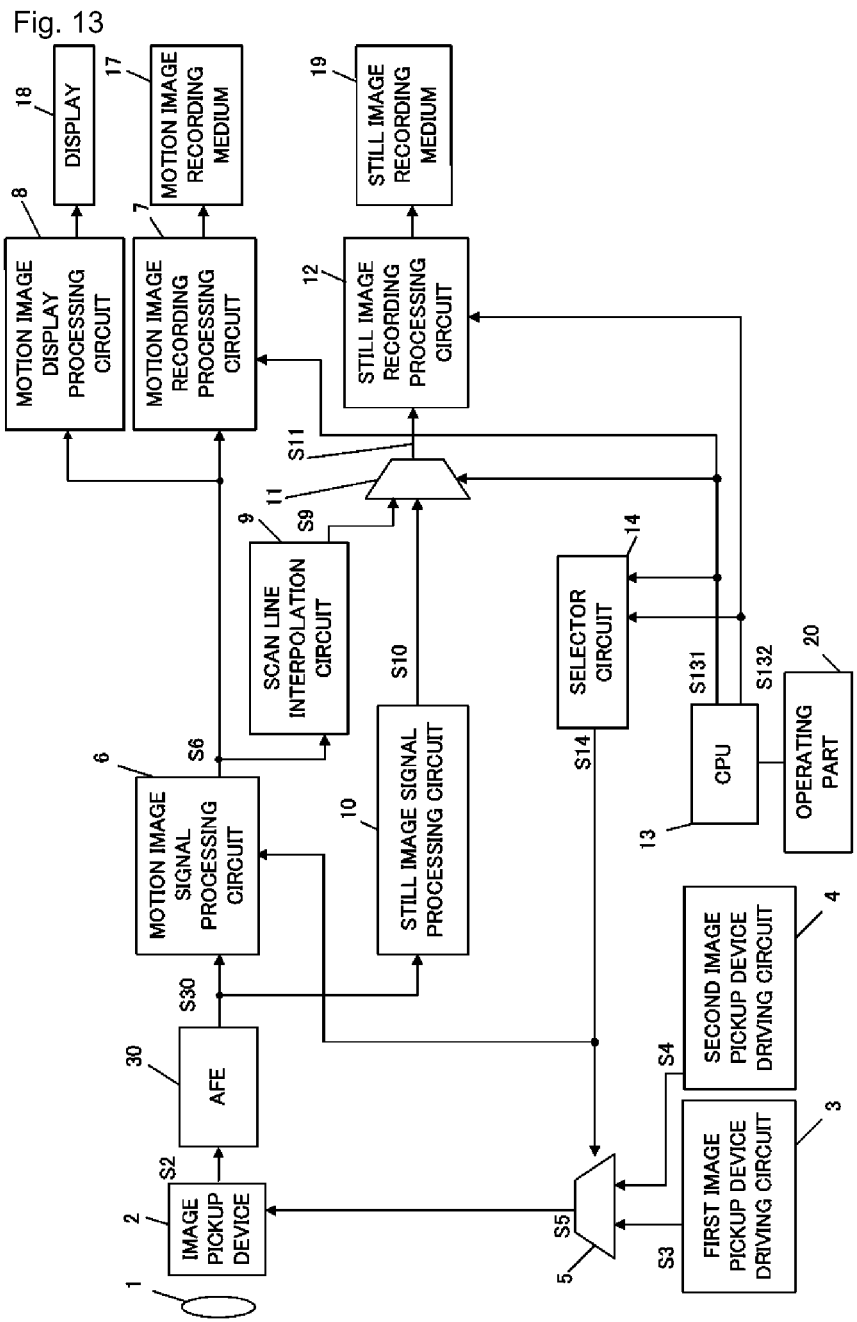
FIG. 13 is a block diagram of a video camera (second embodiment).

FIG. 13 is a block diagram of a video camera (image pickup apparatus) according to a second embodiment. Those elements in FIG. 13, which are the same as corresponding elements in FIG. 1, are designated by the same reference numerals, and a duplicate description will be omitted. Since the structure and timing chart of the image sensor 2 in this embodiment are similar to those of FIGS. 2-6 in the first embodiment, a description thereof will be omitted.

An image of the object is formed onto the image sensor 2 through the lens 1, and the image sensor 2 photographs the object and outputs the video output signal S2. The (first) selector 5 selects one of the V/H synchronization signal S3 output from the first image sensor driving circuit 3 and the V/H synchronization signal S4 output from the second image sensor driving circuit 4. The V/H synchronization signal S3 or S4 selected by the selector 5 is supplied as its output signal S5 to the image sensor 2.

The first image sensor driving circuit 3 generates the V/H synchronization signal S3 configured to drive the image sensor 2 so as to convert the object image taken through the interlace scanning of the image sensor 2 into an electric signal. The second image sensor driving circuit 4 generates the V/H synchronization signal S4 configured to drive the image sensor 2 so as to convert the object image taken through the progressive scanning of the image sensor 2 into an electric signal. The video output signal S2 corresponds to the interlace scanning when the V/H synchronization signal S3 is supplied to the image sensor 2, and corresponds to the progressive scanning when the V/H synchronization signal S4 is supplied to the image sensor 2.

Reference numeral 30 denotes an analog front end ("AFE") that includes a correlated double sampling ("CDS") circuit and an analog-to-digital (A/D) conversion circuit. The CDS circuit is a circuit configured to remove a reset noise that is dominant in the noises contained in the video output signal S2 of the image sensor 2. The A/D conversion circuit is a circuit configured to convert an analogue image into a digital image. The AFE 30 is a circuit configured to convert an analogue signal into a digital signal that is processible by the motion image signal processing circuit 6.

The motion signal processing circuit 6 receives, as input signals, the output signal S30 of the AFE 30 and the output signal S14 of the selector circuit 14, performs motion-image signal processing for the output signal S30 of the AFE 30, and outputs as the output signal S6 the motion image signal based on the interlace scanning.

The motion image recording processing circuit 7 receives, as input signals, the output signal S6 of the motion image signal processing circuit 6 and the output signal S131 of the CPU 13, and records the output signal S6 of the motion image signal processing circuit 6 in the motion image recording media 17 when the motion image is being recorded, and provides no process when the motion image is not being recorded.

The motion image display processing circuit 8 receives as an input signal the output signal S6 of the motion image signal processing circuit 6, and displays the output signal S6 of the motion image signal processing circuit 6 in the display 18 attached to the image pickup apparatus. The motion image display processing circuit 8 displays the output signal S6 of the motion image signal processing circuit 6 whether the selector 5 selects the first image sensor driving circuit 3 or the second image sensor driving circuit 4.

The scan line interpolation circuit 9 receives as an input signal the output signal S6 of the motion image signal processing circuit 6. The scan line interpolation circuit 9 interpolates a scan line in the output signal S6 of the motion image signal processing circuit 6 as the video signal of the interlace scanning, converts it into the video signal of the progressive scanning, and outputs the output signal S9.

The still image signal processing circuit 10 receives the output signal S20 of the AFE 30 as an input signal, performs still image signal processing for that signal, and outputs the output signal S10 as the video signal based on the progressive scanning.

The selector 11 receives as receiving signals the output signal S9 of the scan line interpolation circuit 9, the output signal S10 of the still image signal processing circuit 10, and the output signal S131 of the CPU 13. The selector 11 selects one of the output signal S9 of the scan line interpolation circuit 9 and the output signal S10 of the still image signal processing circuit 10, based on a value of the output signal S131 of the CPU 13, and outputs the selected signal as the output signal S11. More specifically, the selector 11 selects the third video signal of the scan line interpolation circuit 9 when the output signal S131 of the CPU 13 is 0, and selects the second video signal of the still image signal processing circuit 10 when the output signal S131 of the CPU 13 is 1.

The still image recording processing circuit 12 receives, as input signals, the output signal S11 of the selector 11 and the output signal S132 of the CPU 13. The still image recording processing circuit 12 records the output signal S11 of the selector 11 in the still image recording media 19 when a command to record a still image is issued, and no process is performed when no command to record a still image is issued.

The CPU (controller) 13 outputs the (first identification) signal S131 indicating whether the motion image is being recorded or recording of the motion image is waited, or the (second identification) signal S132 indicating whether a command to record a still image is issued. In other words, the CPU 13 outputs the output signal S131 of 0 when no motion image is being recorded or no recording of the motion image is waited, and outputs the output signal S131 of 1 when a motion image is being recorded or recording of the motion image is waited. The CPU 13 outputs the output signal S132 of 0 when no command to record a still image is issued, and outputs the output signal S132 of 1 when a command to record a still image is issued.

The operating part 20 includes a release button, an operation dial, a variety of buttons, a switch, and a lever, and informs the CPU 13 that a photographer has instructed to take and record a motion or still image. The CPU 13 determines whether a command to take or record a motion or still image is issued, based on a notice from the operating part 20.

The selector circuit 14 receives, as input signals, the output signals S131 and S132 of the CPU 13, and outputs a synchronization signal to be provided to the image sensor 2 and an output signal S14 that determines an operation of the motion image signal processing circuit 6. When the output signal S131 from the CPU 13 of 1 indicating that a motion image is being recorded or recording of a motion image is waited is output, and the output signal S132 of 1 indicating that a command to record a still image is output, it is understood that a command to record a still image is issued when the motion image is being recorded or recording of the motion image is waited. When the output signal S131 from the CPU 13 of 1 indicating that a motion image is being recorded or recording of a motion image is waited is output, and the output signal S132 of 0 indicating that no command to record a still image is output, it is understood that a motion image is being recorded or recording of a motion image is waited.

In either case, the selector circuit 14 outputs as the output signal S14 a (first state) signal 0 indicating one of the states where a shooting of a motion image is waited, a motion image is being photographed, a still image is recorded when a shooting of a motion image is waited, or a still image is recorded while a motion image is being photographed.

When the output signal S131 from the CPU 13 of 0 indicating that no motion image is being recorded or no recording of the motion image is waited is output, and the output signal S132 of 1 indicating that that a command to record a still image is output, it is understood that a command to record a still image is issued when no motion image is being recorded or no recording of a motion image is waited. In this case, the selector circuit 14 outputs as the output signal S14 a (second state) signal 1 indicating that the still image is recorded.

The selector 5 selects the first image sensor driving circuit 3 when the selector circuit 14 outputs the first state signal 0 as the output signal S14. In addition, the selector selects the second image sensor driving circuit 4 when the selector circuit 14 outputs the second state signal 1 as the output signal S14. This configuration can prevent a still image from being mixed in a motion image, and an output image from being unnatural.

When the output signal S14 of the selector circuit 14 is 0, the selector 5 outputs as the output signal S5 the V/H synchronization signal S3 output from the first image sensor driving circuit 3 so that the image sensor 2 can be driven by the interlace scanning at a field period. On the other hand, the output signal S14 of the selector circuit 14 is 1, the selector 5 outputs as the output signal S5 the V/H synchronization signal S4 output from the second image sensor driving circuit 4 so that the image sensor 2 can be driven by the progressive scanning at a frame period.

The motion image signal processing circuit 6 receives as input signals the output signal S30 of the AFE 30 and the output signal S14 of the selector circuit 14. When the output signal S14 of the selector circuit 14 is 0, the motion image signal processing circuit 6 performs a variety of motion-image processes, such as an aperture correction, a gamma correction, a brightness adjustment, and a white balance, performs a resize process for the angle of view of the format for the motion image recording, and outputs the output signal S6. On the other hand, when the output signal S14 of the selector circuit 14 is 1, the output signal S6 of the motion image signal processing circuit 6 is valid only to the motion image display processing circuit 8. The motion image signal processing circuit 6 provides a resize process for the output signal S30 of the AFE 30 so that it can have the same angle of view as that for the motion image processing time, and outputs the output signal S6 as the video signal of the interlace scanning. Alternatively, the motion image signal processing circuit 6 may output the output signal S6 as an image signal that indicates that a still image is recorded.

When the output signal S131 of the CPU 13 is 1, the motion image recording processing circuit 7 records the output signal S6 of the motion image signal processing circuit 6 in the motion image recording medium, because a motion image is being recorded. When the output signal S131 of the CPU 13 is 0, the motion image recording processing circuit 7 performs no processes because no motion image is being recorded.

The scan line interpolation circuit 9 performs a scan line interpolation process of the interlace scanning, and outputs as the output signal S9 the video signal of the progressive scanning. The scan line interpolation process, for example, uses a field memory configured to delay an input signal by one field, performs a motion determination and a gradient determination based on the information of the current field and one previous field, and generates an interpolation line signal. The video signal of the progressive scanning is output by outputting this input signal and this interpolation line signal. This scan line interpolation process is illustrative, and the interpolation signal may be generated by using a plurality of fields.

The selector 11 selects one of the output signal S9 of the scan line interpolation circuit 9 and the output signal S10 of the still image signal processing circuit 10, and outputs the selected signal as the output signal S11. When the output signal S131 of the CPU 13 is 1, the selector 11 outputs as the output signal S11 the output signal S9 of the scan line interpolation circuit 9. On the other hand, when the output signal S131 of the CPU 13 is 0, the selector 11 outputs as the output signal S11 the output signal S10 of the still image signal processing circuit 10.

The still image recording processing circuit 12 receives, as input signals, the output signal S11 of the selector 11 and the output signal S132 of the CPU 13. The output signal S132 of the CPU 13 is 1 means that a command to record a still image is issued, and thus the still image recording processing circuit 12 records the output signal S11 of the selector 11 in the still image recording media. The output signal S132 of the CPU 13 is 0 means that no command to record the still image is issued, and thus the still image recording processing circuit 12 performs no processes.

The selector circuit 14 receives as input signals the outputs S131 and S132 of the CPU 13. When the output signal S131 of the CPU 13 is 0 and the output signal S132 of the CPU 13 is 1, the output signal S14 of the selector circuit 14 becomes 1 and the image sensor 2 is controlled under still image driving of the progressive scanning. The output signal S6 of the motion image signal processing circuit 6 is valid only to the motion image display processing circuit 8, performs a resize process for the output signal S30 of the AFE 30 so that it can have the same angle of view as that for the motion image processing time, and outputs as the output signal S6 the video signal of the interlace scanning. Alternatively, an image that indicates that a still image is recorded may be output as the output signal S6. The still image signal processing circuit 10 performs image processing for a still image of the progressive scanning, and the selector 11 communicates the output signal S10 of the still image signal processing circuit 10 to the still image recording processing circuit 12.

In other cases, the output signal S14 of the selector circuit 14 becomes 0, and the image sensor 2 is controlled under field motion image driving of the interlace scanning. In addition, the motion image signal processing circuit 6 performs field motion image processing of the interlace scanning, and the motion image recording processing circuit 7 and the motion image display processing circuit 8 are supplied with field motion images. Alternatively, the selector 11 communicates the output signal S9 of the scan line interpolation circuit 9 to the still image recording processing circuit 12.

According to this embodiment, both the motion image shooting operation and the still image shooting operation are made simple and a still image can be photographed while a motion image is being photographed so as to keep a right moment to take a good image. In this case, the deterioration of the resolution can be restrained in a recorded still image. In addition, an unnatural motion that would occur in a displayed or recorded motion image can be restrained so that it cannot be detected by a user of a video camera or it can be maintained at a permissible level.

INDUSTRIAL APPLICABILITY

The image pickup apparatus is applicable to a video camera.

This application claims a benefit of priority based on Japanese Patent Applications Nos. 2008-168493, filed on Jun. 27, 2008, and 2008-145333, filed on Jun. 3, 2008, each of which is hereby incorporated by reference herein in its entirety as if fully set forth herein.

REFERENCE SIGNS LIST

2 Image sensor
3 First image sensor driving circuit
4 Second image sensor driving circuit
13 CPU
15 Evaluation value generation part

The invention claimed is:
1. An image pickup apparatus comprising:
an image sensor configured to output an image signal by taking an object image;
a driver configured to drive the image sensor so as to take the object image through interlace scanning or progressive scanning;
a detector configured to detect a color level of the object image based on color difference signals extracted from the image signal and determine whether or not the color level of the object image falls within a predetermined range centering on a predetermined color based on the image signal output from the image sensor; and
a controller configured to control the driver to select interlace image shooting used to take the object image through the interlace scanning of the image sensor in a case where the detector determines that the color level of the object image falls within the predetermined range centering on the predetermined color, and to select progressive image shooting used to take the object image through the progressive scanning of the image sensor in a case where the detector determines that the color level of the object image does not fall within the predetermined range centering on the predetermined color.
2. An image pickup apparatus according to claim 1, further comprising:
a motion image signal processor configured to output a motion image based on the image signal that is obtained through the interlace scanning of the image sensor;

a still image signal processor configured to output a still image based on the image signal that is obtained through the progressive scanning of the image sensor; and a scan line interpolator configured to output a still image by interpolating a scan line in the image signal that is obtained by the interlace scanning of the image sensor.

3. The image pickup apparatus according to claim 1, further comprising a brightness detector configured to determine whether or not a brightness of the object image is lower than a predetermined threshold based on the image signal output from the image sensor.

4. The image pickup apparatus according to claim 3, wherein the controller is further configured to control the driver to select the interlace image shooting used to take the object image through the interlace scanning of the image sensor in a case where the detector determines that the color level of the object image falls within the predetermined range centering on the predetermined color and the brightness detector determines that the brightness of the object image is lower than the predetermined threshold, and configured to select the progressive image shooting used to take the object image through the progressive scanning of the image sensor in a case where the detector determines that the color level of the object image does not fall within the predetermined range centering on the predetermined color and the brightness detector determines that the brightness of the object image is not lower than the predetermined threshold.

5. A method for controlling an image pickup apparatus, the method comprising:
    outputting, by an image sensor, an image signal by taking an object image;
    driving the image sensor so as to take the object image through interlace scanning or progressive scanning;
    detecting a color level of the object image based on color difference signals extracted from the image signal;
    determining whether or not a color level of the object image falls within a predetermined range centering on a predetermined color based on the image signal output from the image sensor;
    selecting interlace image shooting used to take the object image through the interlace scanning of the image sensor in a case where it is determined that the color level of the object image falls within the predetermined range centering on the predetermined color; and
    selecting progressive image shooting used to take the object image through the progressive scanning of the image sensor in a case where it is determined that the color level of the object image does not fall within the predetermined range centering on the predetermined color.

6. The method according to claim 5, further comprising:
    outputting a motion image based on the image signal that is obtained through the interlace scanning of the image sensor;
    outputting a still image based on the image signal that is obtained through the progressive scanning of the image sensor; and
    outputting a still image by interpolating a scan line in the image signal that is obtained by the interlace scanning of the image sensor.

7. The method according to claim 5, further comprising determining whether or not a brightness of the object image is lower than a predetermined threshold based on the image signal output from the image sensor.

8. The method according to claim 7,
    wherein selecting the interlace image shooting used to take the object image through the interlace scanning of the image sensor is performed in a case where it is determined that the color level of the object image falls within the predetermined range centering on the predetermined color and it is determined that the brightness of the object image is lower than the predetermined threshold, and
    wherein selecting the progressive image shooting used to take the object image through the progressive scanning of the image sensor is performed in a case where it is determined that the color level of the object image does not fall within the predetermined range centering on the predetermined color and it is determined that the brightness of the object image is not lower than the predetermined threshold.

9. A non-transitory computer-readable medium storing instructions that, when executed by a processor, perform a method comprising:
    outputting, by an image sensor, an image signal by taking an object image;
    driving the image sensor so as to take the object image through interlace scanning or progressive scanning;
    detecting a color level of the object image based on color difference signals extracted from the image signal;
    determining whether or not a color level of the object image falls within a predetermined range centering on a predetermined color based on the image signal output from the image sensor;
    selecting interlace image shooting used to take the object image through the interlace scanning of the image sensor in a case where it is determined that the color level of the object image falls within the predetermined range centering on the predetermined color; and
    selecting progressive image shooting used to take the object image through the progressive scanning of the image sensor in a case where it is determined that the color level of the object image does not fall within the predetermined range centering on the predetermined color.

10. The non-transitory computer-readable medium according to claim 9, wherein the method further comprises:
    outputting a motion image based on the image signal that is obtained through the interlace scanning of the image sensor;
    outputting a still image based on the image signal that is obtained through the progressive scanning of the image sensor; and
    outputting a still image by interpolating a scan line in the image signal that is obtained by the interlace scanning of the image sensor.

11. The non-transitory computer-readable medium according to claim 9, wherein the method further comprises determining whether or not a brightness of the object image is lower than a predetermined threshold based on the image signal output from the image sensor.

12. The non-transitory computer-readable medium according to claim 11, wherein selecting the interlace image shooting used to take the object image through the interlace scanning of the image sensor is performed in a case where it is determined that the color level of the object image falls within the predetermined range centering on the predetermined color and it is determined that the brightness of the object image is lower than the predetermined threshold, and
    wherein selecting the progressive image shooting used to take the object image through the progressive scanning of the image sensor is performed in a case where it is determined that the color level of the object image does not fall within the predetermined range centering on the predetermined color and it is determined that the brightness of the object image is not lower than the predetermined threshold.

* * * * *